(12) United States Patent
Paul

(10) Patent No.: US 10,478,710 B1
(45) Date of Patent: Nov. 19, 2019

(54) MAGNETIC PLAYING CARDS WITH INTERCHANGEABLE COMPONENTS

(71) Applicant: Gregory Donald Paul, Downey, CA (US)

(72) Inventor: Gregory Donald Paul, Downey, CA (US)

( * ) Notice: Subject to any disclaimer, the term of this patent is extended or adjusted under 35 U.S.C. 154(b) by 0 days.

(21) Appl. No.: 16/058,870

(22) Filed: Aug. 8, 2018

(51) Int. Cl.
| | |
|---|---|
| *A63F 1/02* | (2006.01) |
| *H01F 10/26* | (2006.01) |
| *H01F 10/14* | (2006.01) |
| *H01F 7/02* | (2006.01) |
| *A63F 1/04* | (2006.01) |
| *A63F 3/00* | (2006.01) |
| *A63F 13/822* | (2014.01) |

(52) U.S. Cl.
CPC .............. *A63F 1/02* (2013.01); *H01F 7/02* (2013.01); *H01F 10/14* (2013.01); *H01F 10/26* (2013.01); *A63F 3/00694* (2013.01); *A63F 13/822* (2014.09); *A63F 2001/0408* (2013.01); *A63F 2001/0441* (2013.01); *A63F 2001/0475* (2013.01); *A63F 2003/00738* (2013.01); *A63F 2250/60* (2013.01)

(58) Field of Classification Search
CPC ................ A63F 1/02; A63F 2001/0475; A63F 2001/0408; A63F 2001/0441; A63F 13/822; A63F 3/00694; A63F 2003/00738; A63F 2250/60
USPC ................................ 273/239, 292–296, 290
See application file for complete search history.

(56) References Cited

U.S. PATENT DOCUMENTS

| | | | | |
|---|---|---|---|---|
| 155,752 | A | * 10/1874 | Richardson | ............... A63F 9/20 273/294 |
| 2,521,017 | A | 9/1950 | Moen et al. | |
| 2,600,951 | A | * 6/1952 | Edwards | ................... A63F 1/06 273/239 |
| 3,345,759 | A | * 10/1967 | William | ................. G09B 19/02 273/294 |
| 4,170,358 | A | 10/1979 | Hancock | |
| 5,458,282 | A | 10/1995 | Martin | |

(Continued)

FOREIGN PATENT DOCUMENTS

| | | |
|---|---|---|
| FR | 2794058 | 7/2001 |
| JP | 2008528119 | 7/2008 |
| RU | 104515 | 5/2011 |

*Primary Examiner* — Benjamin Layno
(74) *Attorney, Agent, or Firm* — Cionca IP Law P.C.; Marin Cionca

(57) ABSTRACT

A magnetized playing card having: a first component; and a second component that joins with the first component to form the magnetized playing card; the first component having: a front first component face; a back first component face; wherein at least a first section of the back first component surface is a magnetized surface; the magnetized surface having: a plurality of magnetic poles comprising north poles and south poles; wherein the north poles and the south poles are in parallel with each other, and the north poles alternate with the south poles in an alternating formation; and wherein the alternating formation faces a first direction to create a first magnetic alignment; the second component having: a front second component face; a back second component face; wherein the second component joins with the first component via the back first component face and the back second component face.

20 Claims, 7 Drawing Sheets

(56) References Cited

U.S. PATENT DOCUMENTS

| | | | |
|---|---|---|---|
| 5,478,085 A * | 12/1995 | Canner | A63F 3/00694 |
| | | | 273/239 |
| 5,632,489 A | 5/1997 | Rozzi, Sr. et al. | |
| 5,887,899 A | 3/1999 | Dobbins | |
| 5,949,050 A * | 9/1999 | Fosbenner | G09F 9/375 |
| | | | 235/449 |
| 6,402,144 B1 * | 6/2002 | Ekberg | A63F 9/0098 |
| | | | 273/239 |
| 6,435,508 B1 | 8/2002 | Tavel | |
| 6,604,741 B1 | 8/2003 | Snow | |
| 7,104,541 B2 * | 9/2006 | Green | A63F 1/02 |
| | | | 273/239 |
| 7,604,236 B2 * | 10/2009 | Lou-Hsiao | G09B 1/16 |
| | | | 273/269 |
| 7,900,845 B2 * | 3/2011 | Stagg | B42D 15/006 |
| | | | 235/493 |
| 2008/0217907 A1 | 9/2008 | Dean et al. | |

\* cited by examiner

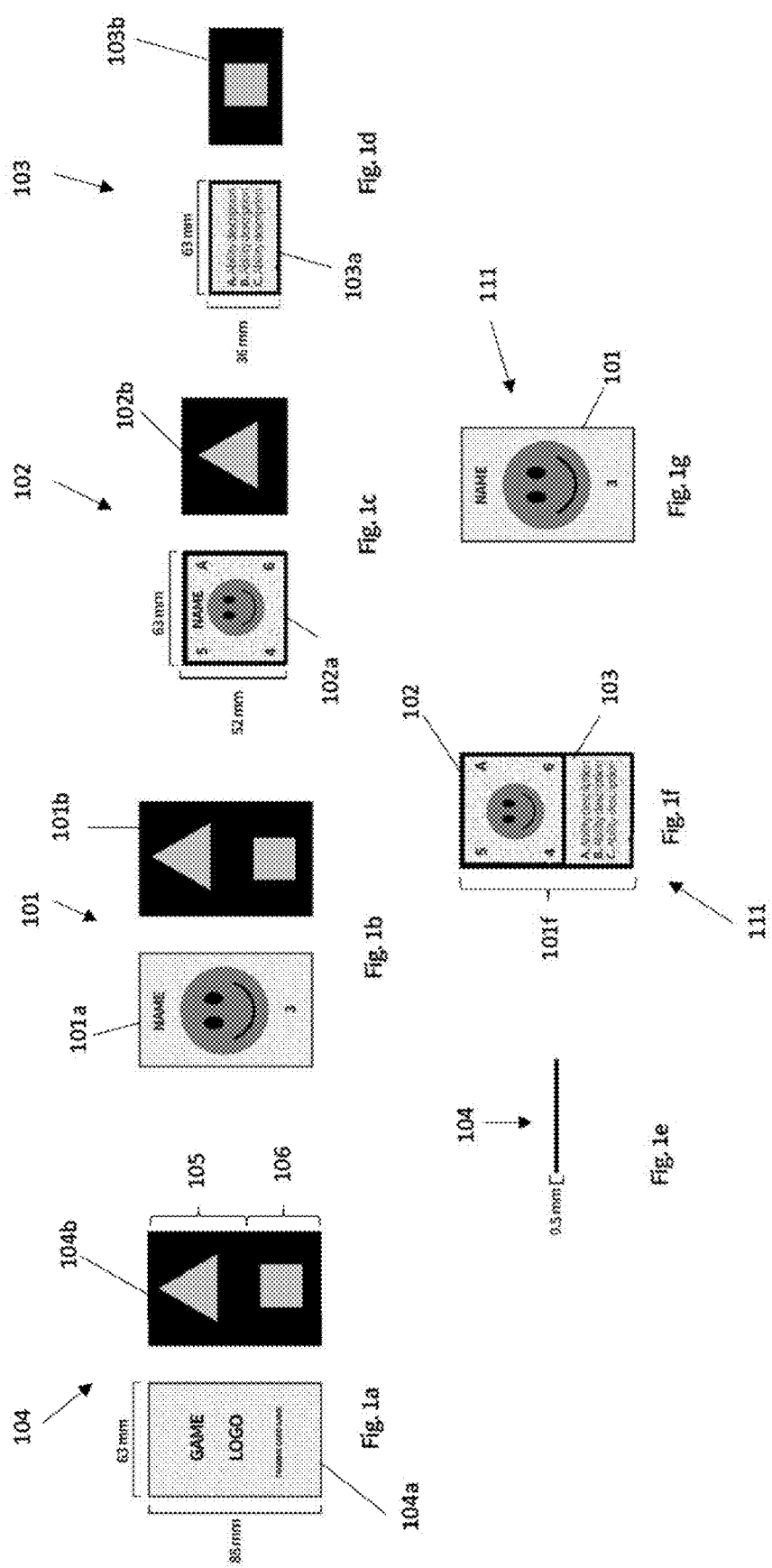

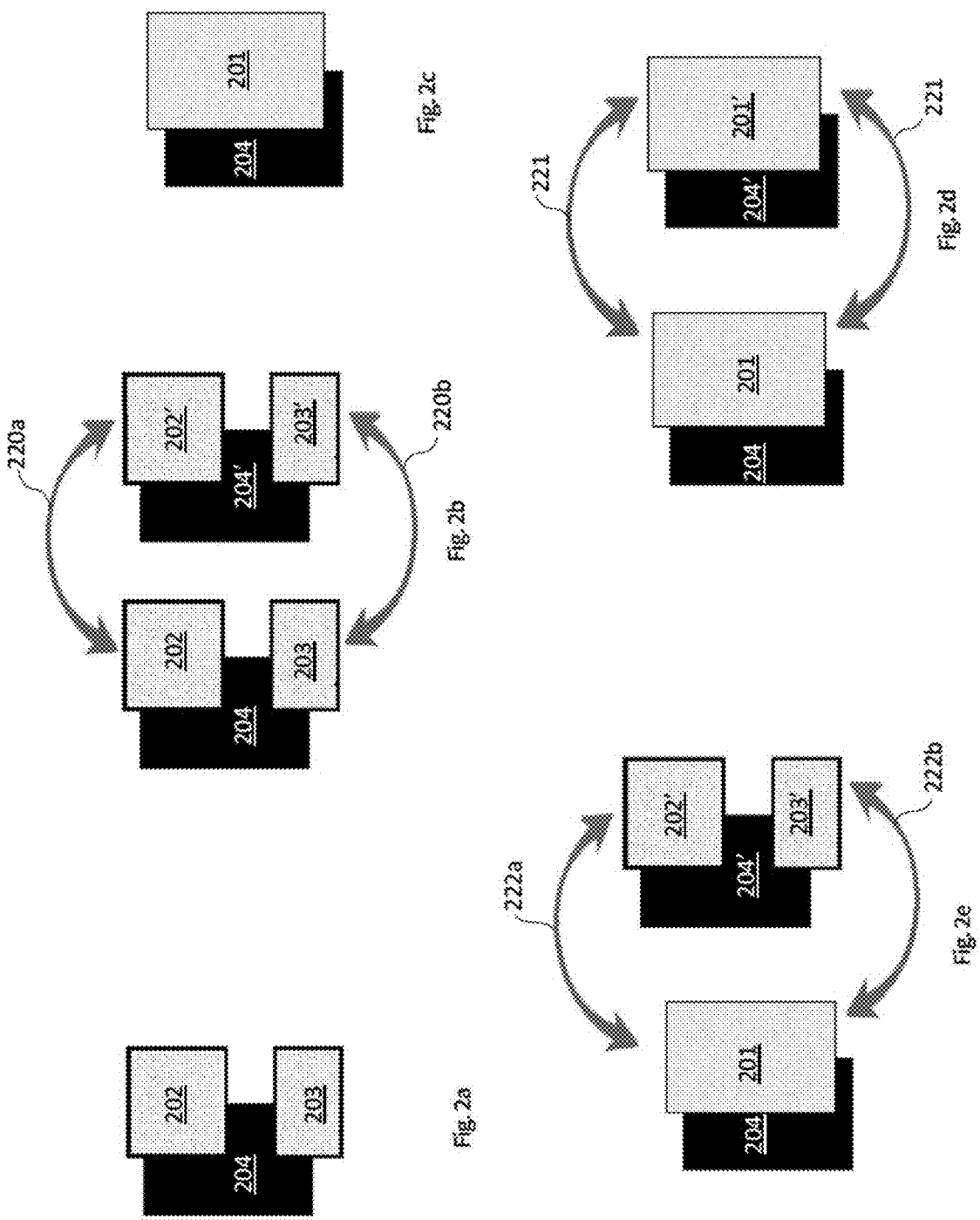

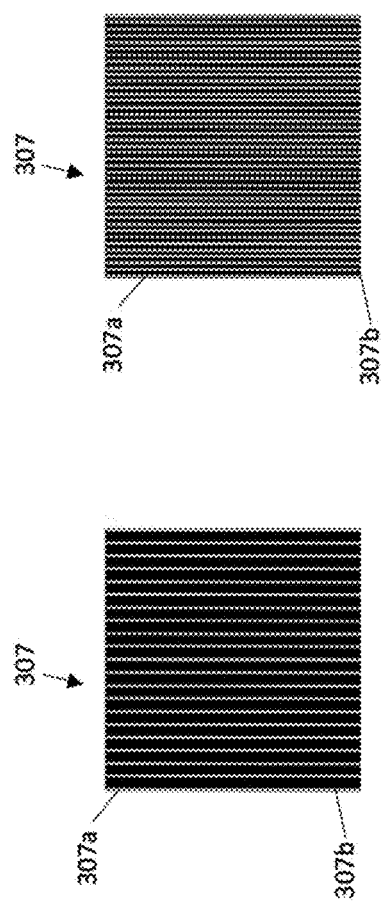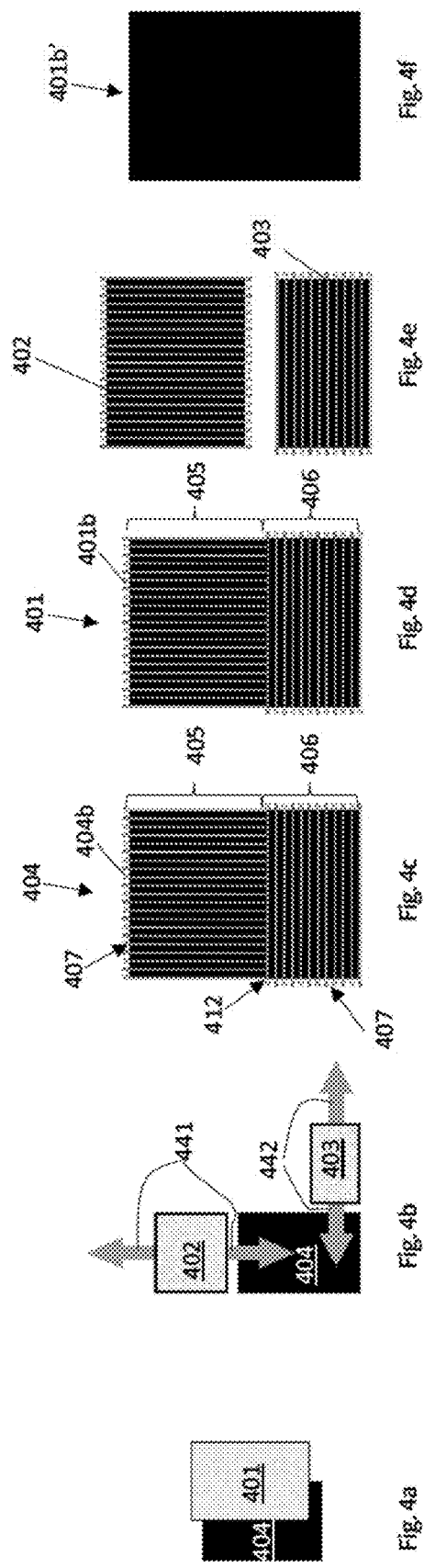

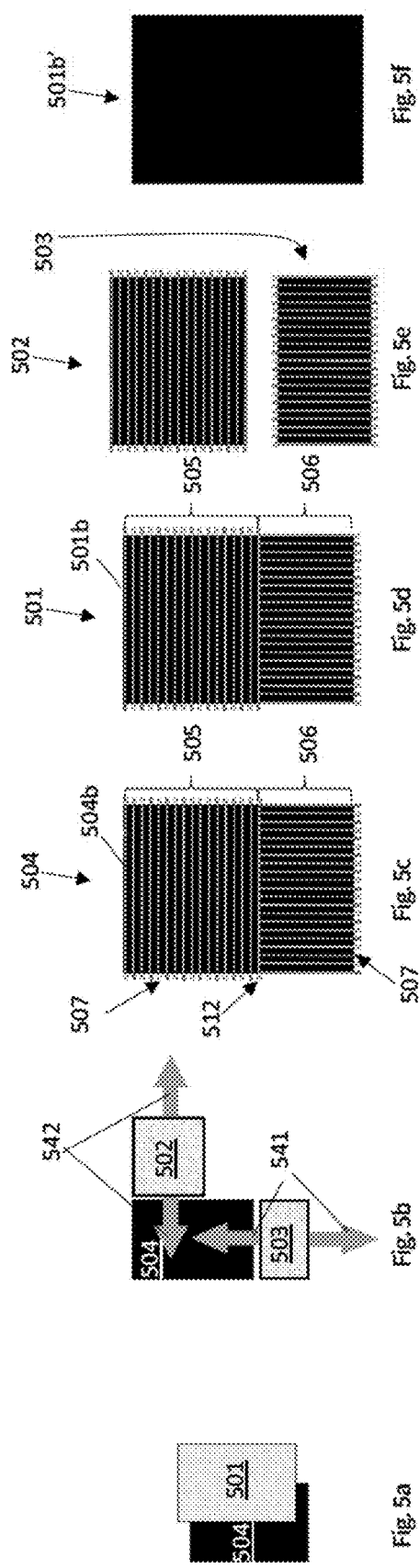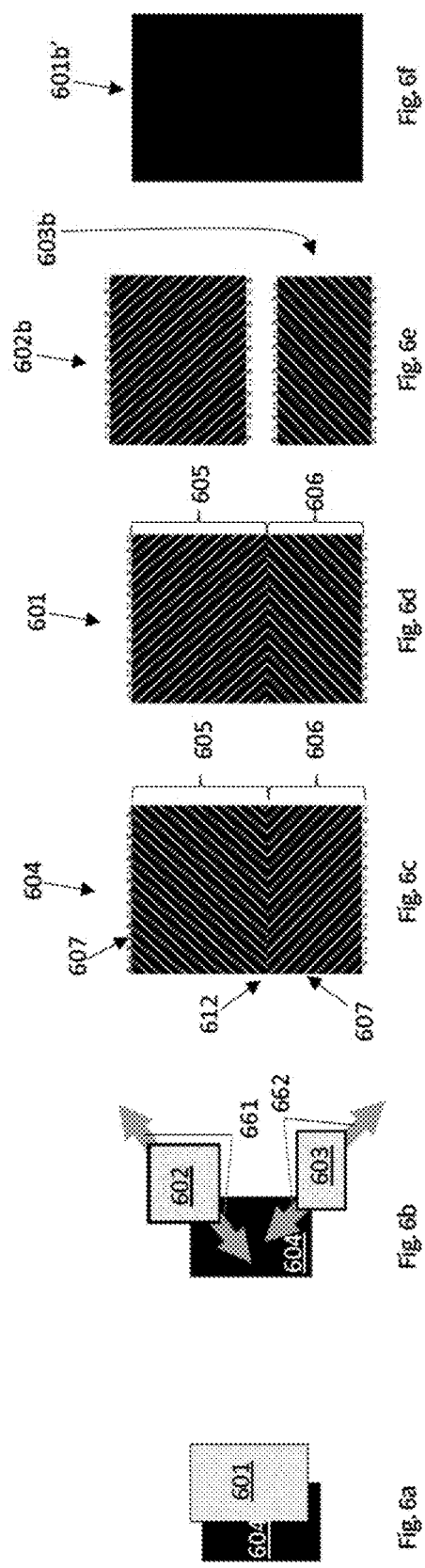

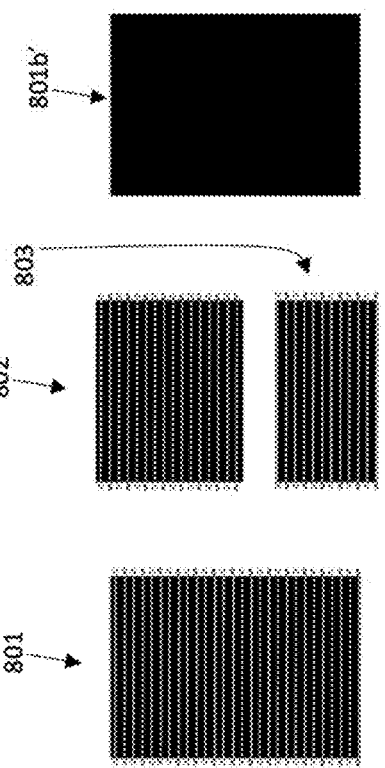
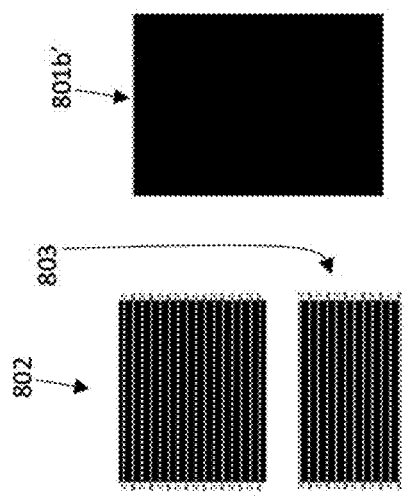
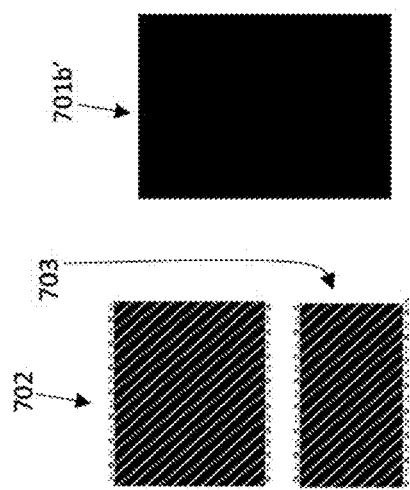
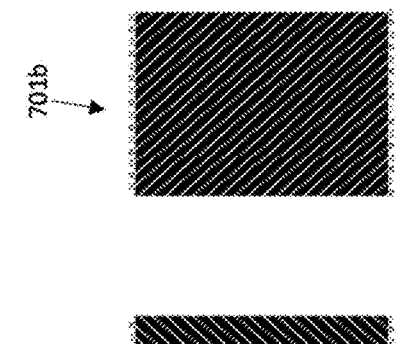
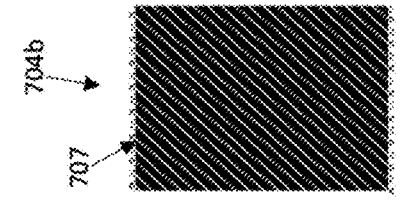
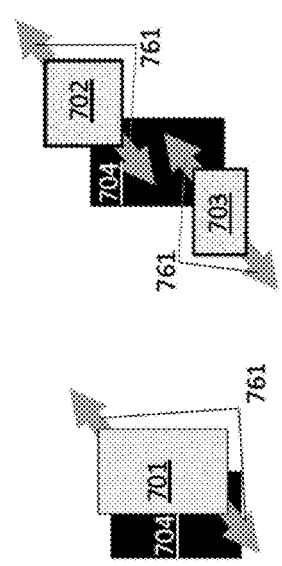
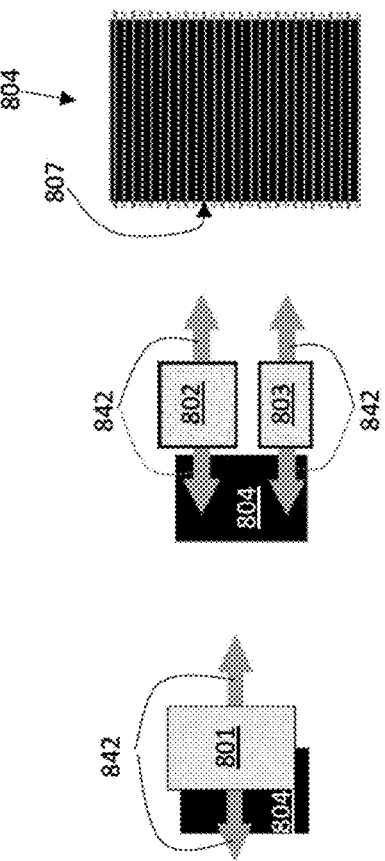

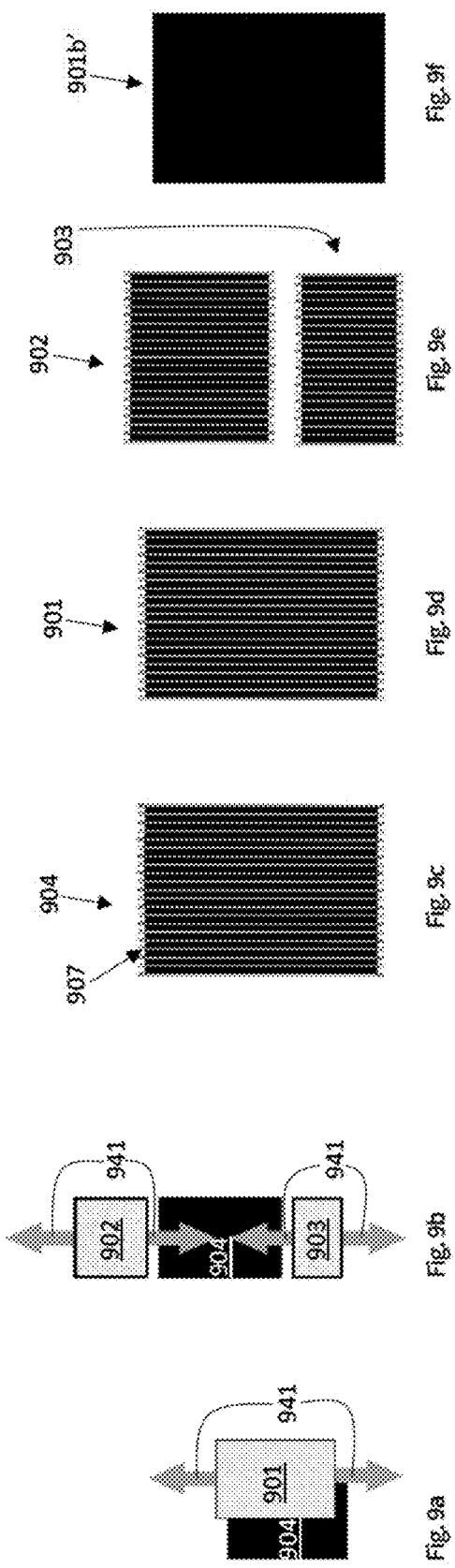

MAGNETIC PLAYING CARDS WITH INTERCHANGEABLE COMPONENTS

BACKGROUND OF INVENTION

1. Field of the Invention

The invention relates generally to playing cards and more particularly to magnetic playing cards with interchangeable components.

2. Description of the Related Art

Traditional playing cards, such as standard decks of cards or cards used for collectible games, are limited in that each card has only one variation. In the case of a trading card game, players must buy packs of new cards to upgrade their deck and develop new card combinations. Additionally, if players wish to trade cards, then each player risks losing important abilities or characters. The limitations of traditional playing cards can also halt game creators from designing new and innovative games. Traditional playing cards are also not very durable. They are often made of a cardstock or similar material, which can be easily damaged via water or tearing, or general wear and tear. Thus, there is a need for a new and improved playing cards that address and solve the problems outlined above.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, magnetic playing cards with interchangeable components ("magnetic playing cards," "interchangeable card," "playing card," "card") disclosed herein provide game creators and players with the ability to customize and upgrade their cards without the need for purchasing new packs of cards. In an aspect, a magnetic playing card is provided, having a first component and a second component, wherein the first component and the second component can be made up of one or more portions. The first component makes up the back face of the card, and the second component makes up the front face of the card. In another aspect, the second component has one portion. In another aspect, the second component has two portions. The first and second components of a magnetic playing card can be traded, swapped, and interchanged. Thus, an advantage is that a set of cards may be easily and efficiently changed, upgraded, or otherwise manipulated such that a user can alter their selection of cards without the need for purchasing additional cards or card parts. Another advantage may be that a user may more easily trade cards or card components with another user.

In another aspect, each component is made with a layer of rubber mixed with iron dust and one or more layers of material that may be printed on (such as vinyl or cardstock). An advantage may be that the magnetic playing cards may be more durable than standard or typical playing cards constructed from cardstock or similar material. Another advantage may be that the layer of rubber mixed with iron dust can also provide players with an easy way to display their favorite artwork on a refrigerator, or any other suitable magnetic surface.

In another aspect, the magnetic layers of the magnetic playing cards may be provided in specific vertical, horizontal, or diagonal alignments that encourage the pairing and alignment of the various magnetic playing card components. Thus, an advantage may be that the switching of the card components may be efficient, quick, and easy for the user. Another advantage may be that the pairing of magnetic playing card components can be achieved more easily when the pieces are biased to be slid or moved in the direction of the magnetic alignment. This may be easier for a user to carry out, over "stamping" the card components together, or sliding the card components against the grain of the magnetic alignment.

In another aspect, a magnetized playing card is provided, the magnetized playing card comprising: a front card face; a back card face; a top card end; a bottom card end; a first card component; and a second card component that joins with the first card component to form the magnetized playing card; the first card component having: a front first card component face; a back first card component face; wherein at least a first section of the back first card component face is a first magnetized surface; the first magnetized surface having: a first plurality of magnetic poles comprising north poles and south poles; wherein the north poles and the south poles are in parallel with each other, and the north poles alternate with the south poles in an alternating formation; and wherein the alternating formation faces a first direction to create a first magnetic alignment; the second card component having: a front second card component face; a back second card component face having a second magnetized surface; the second magnetized surface having an opposite corresponding first magnetic alignment; the first magnetic alignment being capable of biasing an association of the first magnetized surface with the second magnetized surface along the first direction; wherein the opposite corresponding first magnetic alignment also faces the first direction and comprises south poles that correspond to the north poles of the first magnetized surface, and north poles that correspond to the south poles of the first magnetized surface; and wherein the second card component joins with the first card component via the back first card component face and the back second card component face, such that the front first component face is visible and comprises the front card face, and such that the front second component face is opposite to the front first component face and is visible, and comprises the back card face. Thus, again, an advantage is that a set of cards may be easily and efficiently changed, upgraded, or otherwise manipulated such that a user can alter their selection of cards without the need for purchasing additional cards or card parts. Another advantage may be that a user may more easily trade cards or card components with another user. Another advantage may be that the switching of the card components may be efficient, quick, and easy for the user. Another advantage may be that the pairing of magnetic playing card components can be achieved more easily when the pieces are biased to be slid or moved in the direction of the magnetic alignment provided. Another advantage may be that the magnetized playing cards may be more durable and less prone to damage than cards constructed from paper or traditional cardstock.

In another aspect, a magnetized playing card is provided, the magnetized playing card comprising a front card face; a top card end; a bottom card end; a first card component; and a second card component that joins with the first card component to form the magnetized playing card; the first card component having: a front first card component face; a back first card component face; wherein at least a first section of the back first card component surface is a first magnetized surface; the first magnetized surface having: a first plurality of magnetic poles comprising north poles and south poles; wherein the north poles and the south poles are in parallel with each other, and the north poles alternate with the south poles in an alternating formation; and wherein the alternating formation faces a first direction to create a first magnetic alignment; the second card component having: a front second card component face; a back second card component face; wherein the second card component joins with the first card component via the back first card component face and the back second card component face. Thus, again, an advantage is that a set of cards may be easily and efficiently changed, upgraded, or otherwise manipulated such that a user can alter their selection of cards without the need for purchasing additional cards or card parts. Another advantage may be that a user may more easily trade cards or card components with another user. Another advantage may be that the switching of the card components may be efficient, quick, and easy for the user. Another advantage may be that the pairing of magnetic playing card components can be achieved more easily when the pieces are biased to be slid or moved in the direction of the magnetic alignment provided. Another advantage may be that the magnetized playing cards may be more durable and less prone to damage than cards constructed from paper or traditional cardstock.

In another aspect, a magnetized playing card is provided, the magnetized playing card comprising: a front card face; a back card face; a top card end; a bottom card end; a first card component; and a second card component that joins with the first card component to form the magnetized playing card; the first card component having: a front first card component face; a back first card component face; and a first magnetized surface; the first magnetized surface having a first section and a second section; the first section having: a first plurality of magnetic poles comprising north poles and south poles; wherein the north poles and the south poles are in parallel with each other, and the north poles alternate with the south poles in an alternating formation; and wherein the alternating formation faces a first direction to create a first magnetic alignment; the second section having: a second plurality of magnetic poles comprising north poles and south poles; wherein the north poles and the south poles are in parallel with each other, and the north poles alternate with the south poles in the alternating formation; and wherein the alternating formation faces a second direction to create a second magnetic alignment; the second card component having: a front second card component face; a back second card component face having a second magnetized surface; a first portion; and a second portion that joins with the first portion to form the second card component; wherein the second magnetized surface within the first portion has an opposite corresponding first magnetic alignment, the opposite corresponding first magnetic alignment facing the first direction and comprising south poles that correspond to the north poles of the first magnetized surface, and north poles that correspond to the south poles of the first magnetized surface within the first section; wherein the second magnetized surface within the second portion has an opposite corresponding second magnetic alignment, the opposite corresponding second magnetic alignment facing the second direction and comprising south poles that correspond to the north poles of the first magnetized surface, and north poles that correspond to the south poles of the first magnetized surface within the second section; the first magnetic alignment being capable of biasing an association of the back first card component face with the second magnetized surface along the first direction; the second magnetic alignment being capable of biasing an association of the back first card component face with the second magnetized surface along the second direction; and wherein the second card component joins with the first card component via the back first card component face and the back second card component face, such that the front first component face is visible and comprises the front card face, and such that the front second component face is opposite to the front first component face and is visible, and comprises the back card face. Thus, again, an advantage is that a set of cards may be easily and efficiently changed, upgraded, or otherwise manipulated such that a user can alter their selection of cards without the need for purchasing additional cards or card parts. Another advantage may be that a user may more easily trade cards or card components with another user. Another advantage may be that the switching of the card components may be efficient, quick, and easy for the user. Another advantage may be that the pairing of magnetic playing card components can be achieved more easily when the pieces are biased to be slid or moved in the direction of the magnetic alignment provided. Another advantage may be that the magnetized playing cards may be more durable and less prone to damage than cards constructed from paper or traditional cardstock.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 1a-d illustrate exemplary embodiments of magnetic playing cards with interchangeable components, wherein each component can be provided in a variety of sizes, according to an aspect.

FIG. 1e illustrates a side elevation view of a magnetic playing card first component 104, according to an aspect.

FIG. 1f illustrates a front view of a magnetic playing card in an assembled state, according to an aspect.

FIG. 1g illustrates a front view of another example of a magnetic playing card in an assembled state, according to an aspect.

FIGS. 2a-2e illustrate examples of how various magnetic playing card components and portions may be attached, detached, and interchanged with each other, according to an aspect.

FIGS. 3a-3b illustrate exemplary magnetic pole spacing and alignments, according to an aspect.

FIGS. 4a-4e show examples of vertical and horizontal magnetic pole alignments that may be used for attaching and detaching the various components of magnetic playing cards, according to an aspect.

FIG. 4f shows a front view of a card component substitute which may have a magnetically receptive material, according to an aspect.

FIGS. 5a-5e illustrate additional examples of vertical and horizontal magnetic pole alignments that may be used for attaching and detaching the various components of magnetic playing cards, according to an aspect.

FIG. 5f shows a front view of a card component substitute which may have a magnetically receptive material, according to an aspect.

FIGS. 6a-6e show examples of diagonal magnetic pole alignments for magnetic playing cards, that may be used for attaching and detaching the various components of magnetic playing cards, according to an aspect.

FIG. 6f shows a front view of a card component substitute which may have a magnetically receptive material, according to an aspect.

FIGS. 7a-7e show additional examples of diagonal magnetic pole alignments for magnetic playing cards, that may be used for attaching and detaching the various components of magnetic playing cards, according to an aspect.

FIG. 7f shows a front view of a card component substitute which may have a magnetically receptive material, according to an aspect.

FIGS. 8a-8e show an example of a horizontal magnetic pole alignment for magnetic playing cards that may be used for attaching and detaching the various components of magnetic playing cards, according to an aspect.

FIG. 8f shows a front view of a card component substitute which may have a magnetically receptive material, according to an aspect.

FIGS. 9a-9e show an example of a vertical magnetic pole alignment for magnetic playing cards, that may be used for attaching and detaching the various components of magnetic playing cards, according to an aspect.

FIG. 9f shows a front view of a card component substitute which may have a magnetically receptive material, according to an aspect.

DETAILED DESCRIPTION

Figure 10B:
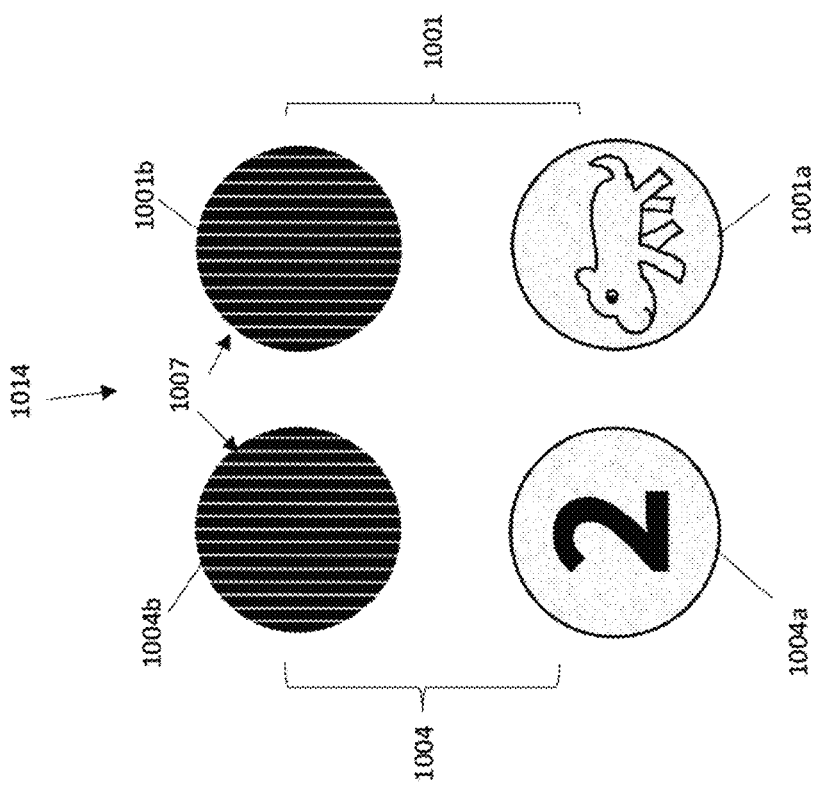
FIGS. 10a-10b illustrate examples of components of a triangular magnetic playing card 1013 and components of a circular magnetic playing card, respectively, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIGS. 1a-d illustrate exemplary embodiments of magnetic playing cards ("magnetic playing cards," "interchangeable card," "playing card," "card") with interchangeable components ("interchangeable components," "card components," or "components"), wherein each component can be provided in a variety of sizes, according to an aspect. Magnetic playing cards may be provided with two components such as a first component 104 of FIG. 1a and a second component 101 of FIG. 1b, which may be combinable and may attach to each other via magnets or magnetic surfaces, to create an assembled magnetic playing card. A magnetic playing card may be comprised of two or more components attached together, for example. Each component of the magnetic playing may be provided with a front surface or face, and a back surface or face.

FIG. 1a illustrates a front side 104a and a back side 104b of an example of a first component 104 of an interchangeable card, according to an aspect. The back side 104b is shown with an upper section 105 and a lower section 106 as an example. The upper section 105 and the lower section 106 may each contain an illustration, or text, or both, for example. The first component 104 is shown with exemplary dimensions that the component may be provided in.

FIG. 1b illustrates a front side 101a and a back side 101b of an example of a second component 101 of an interchangeable card, according to an aspect.

FIG. 1c illustrates a front side 102a and a back side 101b of another example of a portion of a second component 102, according to an aspect. The portion of a second component 102 is shown with exemplary dimensions that the component may be provided in. The portion of the second component 102 may be an upper portion ("upper portion" or "first portion"), for example. The portion of the second component 102 may be combined with other portions in order to assemble a full second component.

FIG. 1d illustrates a front side 103a and a back side 103b of another example of a portion of a second component 103, according to an aspect. The portion of a second component 103 is shown with exemplary dimensions that the component may be provided in. The portion of the second component 103 may be a lower portion ("lower portion" or "second portion"), for example. Again, similar to FIG. 1c, the portion of a second component 103 may be combined with other portions, such as portion 102, to assemble a full second component.

It should be understood that a first portion and a second portion may be associated together in any suitable arrangement. For example, the first portion 102 may be an upper portion as shown, and the second portion 103 may be a lower portion as shown. However, the first portion may also be a left portion and the second portion may be a right portion, for example. The portions may also be arranged diagonally or in any other suitable fashion to create a full component of a card.

FIG. 1e illustrates a side elevation view of a magnetic playing card first component 104, according to an aspect. An exemplary thickness of 0.5 mm is provided as the thickness of a single card component. Each component of a magnetic playing card may be, for example, 0.5 mm as in the example shown, and it should be understood that various components of the magnetic playing card may be provided in varying thicknesses and other dimensions. Exemplary dimensions of a magnetic playing card are as follows. The assembled magnetic card having a first component combined with a second component may be approximately 0.8-1.5 mm in thickness. Each individual component, when separated from other components, may be approximately 0.4-0.75 mm in thickness. The assembled card may be approximately 88 mm in height and approximately 63 mm in width. The thickness, height, and width of the components may be primarily determined by providing a card with a suitable thickness and size for preventing tearing and other similar damage while still allowing the magnetic playing card to be inserted into a standard size protective card sleeve. An example of such a protective card sleeve is a sleeve manufactured by Ultra PRO™. A magnetic playing card may be provided with dimension that are ±1-3% of the above exemplary dimensions, and the provided dimensions may differ according to the material used for construction of the magnetic playing card.

FIG. 1f illustrates a front view of a magnetic playing card 111 in an assembled state, according to an aspect. From the front view, a second component 101f, having an upper portion 102 and a lower portion 103, may be visible, and a first component may be positioned behind the second component 101f, and the first component may not be visible in this view. The second component 101f may be assembled by combining the two portions 102 and 103, thus creating a full second component 101f. A magnetic playing card 111 may be assembled by combining the full second component 101f with a first component, for example.

FIG. 1g illustrates a front view of another example of a magnetic playing card 111 in an assembled state, according to an aspect. From the front view, a second component 101, having a single portion, may be visible, and a first component may be positioned behind the second component 101, and the first component may not be visible in this view. The second component 101 may be combined with or attached to the first component to create a magnetic playing card 111. Thus, the visible side of the second component 101 may comprise a front card face of the magnetic playing card, as an example. The opposite face of the magnetic playing card may be the back card face of the magnetic playing card.

It should be noted that each component (104, 101, 102, 103) may be comprised of one or more portions that may be joined together to form the component. As an example, the front side 104a of the first component 104 (as shown in FIG. 1a) and front side 101a of the second component 101 (as shown in FIG. 1b) both have one portion. As another example, the second component 101 of FIG. 1f may be made up of two portions, which may be the portions shown in FIG. 1c-1d, the upper portion 102 and the lower portion 103. Such portions of a component may be equal or unequal in size. As an example, the upper portion 102 of the second component 101f may be larger than the lower portion 103. These portions may be provided with dimensions 63 mm by 52 mm, and 63 mm by 36 mm, respectively. In another example (not shown), the first portion and the second portion of the second component may be equal in size, both having the dimensions 63 mm by 44 mm.

It should also be understood that each component may be comprised of one or more sections within a single integral component, such that each section is provided with a different magnetic alignment. It should also be understood that each magnetized surface of each card component may be partially magnetized, or, the magnetized surface may comprise the entire surface of the card surface. As an example, a card surface may only be magnetized in its corner sections, or, as another example, the full surface of the card face may be magnetized. It should also be understood that the first card component and the second card component may be provided in any combination as described herein, having at least one or more sections that are magnetized, or being comprised of at least two or more portions that join together.

In an exemplary method of using the interchangeable cards, a player ("player" or "user") may attach the back side 104b of the first component 104 to the back side 101b of the second component 101 (that is, with the two back sides 104b and 101b facing each other), thus leaving the front sides of the first and second components (104a and 101a, respectively) visible. As will be discussed in greater detail hereinbelow, the front side of a component (104a, 101a, 102a, and 103a of FIGS. 1a, 1b, 1c, and 1d, respectively) may be printed with game information such as text, art, game logos, ability descriptions, and the like. The back side of a component (104b, 101b, 102b, and 103b of FIGS. 1a, 1b, 1c, and 1d, respectively) may be printed with a guide ("printed guide" or "guide") which may be a shape, instructions, or a combination thereof to indicate to a player or user a preferred orientation for attaching the components together. Each card component may include one printed guide or two or more printed guides.

As an example, each component (such as 101 and 104) of a magnetic playing card may be provided with two layers adhered together. One layer may be a magnetic material such as, for example, a flexible rubber material containing magnetized iron dust ("magnetized rubber," or "magnetized material"), and the second layer may be a thin, flexible material (such as vinyl, paper, plastic, and the like) which may be a printable material for displaying graphics, images, text, and so on ("printable material"). If a component is manufactured with two layers, the printable material layer may be the front side of the component (such as 104a of FIG. 1a) and the magnetized material layer may be the back side of the component (such as 104b of FIG. 1a).

As another example, each component (101 and 104) of a magnetic playing card may have three layers adhered together. One layer may be magnetized rubber, with the other two layers being printable material adhered to both sides of the magnetized rubber. In other words, the three layers may be one layer of magnetized rubber sandwiched between two printable material layers ("sandwich configuration"), thus enabling game information or images to be printed on both sides of the component. It should be noted that each layer of printable material may or may not be the same color and/or material. For example, both layers of printable material may be white vinyl such that both sides of the component would appear the same before printing. As another example shown by FIGS. 1a, 1b, 1c, and 1d, the front side of a component may be white vinyl (104a, 101a, 102a, and 103a, respectively) and the back side of the component may be black vinyl (104b, 101b, 102b, and 103b, respectively).

It should be noted that it is also an option to manufacture the first component with two layers and the second component with three layers, or vice versa. It should also be noted that non-magnetized rubber containing iron dust can be substituted for the magnetized rubber layer of a magnetic playing card, which may be advantageous because this may be attracted to any type of magnetic pole alignment, as will be disclosed in greater detail when referring to FIGS. 4a-4f. Thus, a magnetic playing card may be provided having both magnetized and non-magnetized rubber. When a first component and a second component are provided wherein both pieces are magnetized, it may require that the two components be joined together in a very specific way. This may be advantageous for certain games that may require assembly of cards in a particular fashion. However, if only one of the two pieces is magnetized, then the two components may be joined by aligning the components in multiple ways.

The magnetized rubber may be manufactured and magnetized with a Halbach Array, which results in one side of a component having a strong magnetic field and the other side having a weak magnetic field. That is, a first side may have a first magnetic field, and a second side may have a second magnetic field that is weaker than the first magnetic field. The Halbach Array is known to those of ordinary skill in the art and is achieved by arranging permanent magnets in a spatially rotating pattern, thus the magnetic field is augmented on one side of the array and near zero on the other side. It may be preferable to manufacture components such that the side having the magnetized rubber with a strong magnetic field faces the back side 104b, 101b of the component and the side with a weak magnetic field faces the front side 104a, 101a. The card may also indicate to a player to attach the components in the orientation disclosed hereinbefore. The magnetic playing cards may be constructed such that before any printing is completed, the eye cannot differentiate the front side from the back side of a card component, despite the front side having a stronger magnetic field than the back side, or vice versa.

As an example, shown by FIG. 1a, the magnetic playing cards described herein may have the length and width of a standard playing card, which may be about 88 mm by 63 mm. Exemplary dimensions of a standard poker playing card are 88.9 mm×63.5 mm, and thus the magnetic playing cards may also be provided having these dimensions. However, it should be noted that the magnetic playing cards may be provided in a wide variety of dimensions, sizes, and shapes. For example, the magnetic playing cards can have a triangular shape with side lengths of 4 cm, or may be circular, with a radius of 4 cm, as will be further discussed when referring to FIGS. 10a and 10b. It should also be noted that the dimensions of the first component and the dimensions of the second component may differ from one another. For example, the first component of a magnetic playing card may be rectangular (such as 104 of FIG. 1a) and the second component may be triangular (such as 1001 of FIG. 10a) or circular (such as 1001' of FIG. 10b).

Descriptions of exemplary embodiments of possible magnetic playing cards follow herein. It should be noted that the below examples are not the only possible embodiments of a magnetic playing card and additional embodiments are also possible.

What follows is a description of a first example (Example 1) of a magnetic playing card assembly, referring to FIGS. 1a, 1b, and 1g. A magnetic playing card is provided, having a first component 104 and a second component 101, each with one portion. The magnetic playing card is manufactured with each component having three layers in a sandwich configuration, as described hereinbefore. The first component 104 and the second component 101 both have the dimensions 63 mm by 88 mm. The front side 104a of the first component 104 has a game logo and the name of a trading card game printed on white vinyl or another appropriate or suitable printable material. The front side 101a of the second component 101 has a character name, artwork, and point value printed on white vinyl or other suitable printable material. The back sides of the first and second components 104b and 101b have a triangle and a square printed on black vinyl or another appropriate printable material. These shapes printed on the back sides 104b, 101b of the components, together with the Halbach Array, indicate to the player the preferred orientation for attaching the back side 104b of the first component 104 and the bac side 101b of the second component 101 together. For example, a user may be instructed to join a section printed with a triangle with another card having a section printed with a triangle, and join a section printed with a square with another card having a section printed with a square, and so on. As an example, when the first card component is provided with two or more sections, the back face of the first card component may be provided with a first printed guide denoting the first direction and a second printed guide denoting the second direction, thus signaling or guiding the user a desired method of assembling the card components together. This example of a magnetic playing card is shown assembled in the preferred orientation in FIG. 1g. In other words, the back sides of the first and second components (104b and 101b, of FIGS. 1a and 1b, respectively) are attached together.

It should be understood that each face or side of the various components of the magnetic trading card may be provided with any words, logos, images, text, illustrations, decorative elements, or any other suitable printed matter, or any combination of printed matter ("card print matter," "print matter," "card images," "card text," or "card logo"). The designs or other elements provided on the card may be referred to as "card print matter." The card print matter may be illustrations or text related to a card game, or may be instructions for a user related to the assembly of the card components, as examples.

What follows is a description of a second example (Example 2) of a magnetic playing card assembly, referring to FIGS. 1a, 1c, 1d, and 1f. A magnetic playing card is provided, having a first component 104 and a second component 101f. The first component 104 is made up of one portion and the second component 101f is made up of two portions 102 and 103, and the magnetic playing card assembly is manufactured with each component having three layers in the sandwich configuration, as described hereinbefore. The first component 104 has the dimensions 63 mm by 88 mm, as shown by FIG. 1a. The first portion 102 of the second component 101f has the dimensions 63 mm by 52 mm and the second portion 103 of the second component 101f has the dimensions 63 mm by 36 mm, as shown by FIGS. 1c and 1d, respectively. The front side 104a of the first component 104 may have a game logo and the name of a trading card game printed on white vinyl or another appropriate or suitable printable material. The front side 102a of the first portion 102 of the second component 101f has a character name, artwork, and point value printed on white vinyl or another appropriate printable material. The front side 103a of the second portion 103 of the second component 101f has ability descriptions printed on white vinyl or another appropriate printable material. The back side 104b of the first component 104 has a triangle and a square printed on black vinyl or another appropriate printable material, as shown in FIG. 1a. The back side 102b of the first portion of the second component 102 may have a triangle printed on black vinyl or another appropriate printable material, and the back side 103b of the second portion of the second component 103 may have a square printed on black vinyl or another appropriate printable material, as shown by FIGS. 1c and 1d, respectively. The shapes printed on the back sides of the components, together with the Halbach Array, indicate to the player a preferred orientation for attaching the first and second components together. This example of a magnetic playing card is shown in an assembled state in FIG. 1f. In other words, the back sides of the first and second components (104b, 102b, and 103b, of FIGS. 1a, 1c, and 1d, respectively) are attached together and facing each other. The back side 102b of the first portion 102 of the second component 101f is aligned with and attached to the upper section 105 of the back side 104b of the first component 104. The back side 103b of the second portion 103 of the second component 101f is aligned with and attached to the lower section 106 of the back side 104b of the first component 104.

What follows is a description of a third example (Example 3) of a magnetic playing card assembly, again referring to FIGS. 1a, 1c, 1d, and 1f. A magnetic playing card is provided as in Example 1, having a first component and a second component, with each component having one portion, and manufactured with each component having three layers in a sandwich configuration. The first component 104 has the dimensions 63 mm by 88 mm. In this example, the lower section 106 of the first component 104 is permanently adhered to the portion of a second component 103 of FIG. 1d ("permanent assembly"), thus creating an apparent need for a player to attach the permanent assembly to the upper section 105 of the first component 104. The remaining portion of the second component is 102 of FIG. 1c, having the dimensions 63 mm by 52 mm. In this example, the front side 104a of the first component 104 may have a game logo and the name of a trading card game printed on white vinyl or another appropriate printable material. The front side 102a of the portion of the second component 102 has a character name, artwork, and point value printed on white vinyl or another appropriate printable material. In this example, the back side 104b of the first component has a triangle printed on the upper section 105 and ability descriptions printed on the lower section 106 on black vinyl or another appropriate printable material. The back side 102b of the second component 102 has a triangle printed on black vinyl or another appropriate printable material. The triangles printed on the back sides of the provided components, together with the Halbach Array, indicate to the player the preferred orientation for attaching the first and second components together. This example of a magnetic playing card is shown in an assembled state in FIG. 1f. In other words, the back sides of the first and second components are attached together such that the back side of the second component 102b is attached to the upper section 105 of the back side of the first component 104b.

Magnetic playing cards matching the examples discussed will be referred to hereinafter as "Example 1," "Example 2," and "Example 3" magnetic playing cards.

FIGS. 2a-2e illustrate examples of how various magnetic playing card components and portions may be attached, detached, and interchanged with each other, according to an aspect. The magnetic playing card components disclosed hereinbefore when referring to FIGS. 1a-1f may be attached, detached, and interchanged with each other in various ways.

FIG. 2c shows how the second component 101 may be associated with and also detached from the first component 104 of an Example 1 magnetic playing card.

FIG. 2d shows two similar Example 1 magnetic playing cards. In FIG. 2d, arrows 221 indicate that the second components (201 and 201') of the Example 1 magnetic playing cards may be interchanged with and attached to multiple first components 204 and 204'. In other words, a player can swap the second components of different magnetic playing cards.

Similarly, FIG. 2a shows how the first and second portions 202 and 203 may be detached from the first component 104 of an Example 2 magnetic playing card. Arrow 220a of FIG. 2b indicates that the first portions 202 and 202' of the second component of multiple Example 2 magnetic playing cards may be interchanged. Arrow 220b indicates that the second portions 203 and 203' of the second component may be interchanged with and attached to different first components 204 and 204'. In other words, a player can mix and match the first and second portions 202 and 203 of second components to form many different card combinations.

In FIG. 2e, arrows 222a and 222b indicate that the second component 201 of an Example 1 magnetic playing card and the first and second portions 202' and 203' of the second component of an Example 2 magnetic playing card can be interchanged.

The ability to swap card components and portions allows player to customize their playing cards in many ways. Another advantage may be that many different card combinations are possible.

FIGS. 3a-3b illustrate exemplary magnetic pole spacing and alignments, according to an aspect. Specific magnetic pole alignments can be created during the manufacturing process of the magnetized rubber layer of the components. As shown in FIGS. 3a and 3b, the magnetic poles 307, represented by white lines in this figure and in the following figures, are shown to have a vertical alignment. The magnets may alternate, such that, for example, the pole at the top end 307a is north, and the next magnet is south, and the next is north, and so on. The poles of the bottom end 307b may be the opposite of the top end 307a. It should be understood that the magnetic poles as represented by 307 and represented throughout the figures may be provided in an alternating arrangement as described, such that a north pole is followed by a south pole, and so on. As an example, the poles 307 of FIGS. 3a-3b run vertically from the top end 307a to the bottom end 307b of the card components shown. An exemplary arrangement of magnets is 16 poles per inch, such that each magnet pole is $1/16^{th}$ of an inch apart. Another exemplary arrangement is $1/8^{th}$ of an inch spacing, which may be magnetically weaker than the $1/16^{th}$ of an inch spacing, but an advantage may be that children or others with a weaker grip or smaller hands may find the magnetic cards easier to align and assemble when a $1/8^{th}$ of an inch spacing is provided.

The spacing of the magnets may vary; that is, the width of each magnet may be an eighth of an inch as shown in FIG. 3a, or a sixteenth of an inch as shown in FIG. 3b. The arrangement of the magnets may be established during the manufacturing process. As an example, the width of each magnet in a set or provided assembly of magnetic playing cards may be approximately the same, such that the various components of the magnetic playing cards can easily be associated with each other.

The methods used to manufacture the magnetized rubber layer of magnetic playing cards with specific magnetic pole alignments is known to those of ordinary skill in the art. One method that may be used is by rolling a magnetizer made up of opposite-facing ring magnets over the material. Having specific magnetic pole alignments may help components slide along the direction of the magnetic pole alignment. For example, if two components have vertical magnetic pole alignments, as shown in FIGS. 3a and 3b, they may be capable of sliding vertically against each other when attached. An advantage may be that this can serve as another way to indicate to a player the intended orientation for attaching card components, because it would be difficult to attach a component with a vertical magnetic pole alignment to a component with a horizontal magnetic pole alignment.

FIGS. 4a-4e show examples of vertical and horizontal magnetic pole alignments that may be used for attaching and detaching the various components of magnetic playing cards, according to an aspect. The horizontal alignment of the magnets may, for example, be provided such that the magnets of the upper section 405 are vertical (perpendicular with the top end and bottom end of the magnetic playing card), and the magnets of the lower section 406 are horizontal (parallel with the top and bottom ends of the magnetic playing card). Thus, the magnetic alignments provided may bias the association of the card components together along the directions of the magnetic alignments (such as, for example, along a horizontal direction in 406, or along a vertical direction in 405).

FIG. 4a shows how the second component 401 may be detached from the first component 404 of an Example 1 magnetic playing card. FIG. 4b shows that two second components, a first portion 402 and a second portion 403, can be combined with a first component 404 via the magnetic surfaces of each component, to assemble a second component 501 of a magnetic playing card. The alignments of the magnetic poles on the surfaces of the components may bias each portion into easily moving only in certain directions, thus indicating to the user a desired orientation of attaching the card components together.

The first portion 402 may be biased to slide in the directions indicated by arrows 441, which may be up-and-down directions, to attach to the upper section 405 of the first component 404, and the second portion 403 may be biased to slide in the directions indicated by arrows 442, which may be side-to-side directions, to attach to the lower section 406 of the first component 404. Together, when moved into position, the first portion 402 and the second portion 403 may become a second component, such as the second component 401 shown in an assembled state in FIG. 4d.

Each card component may be provided with a magnetic surface. FIGS. 4c, 4d, and 4e show an exemplary magnetic pole alignment on surfaces of card components. The magnetic surface may be, for example, on the back side 404b of the first component 404, and on the back side 401b of the second component 401. A magnetic playing card may be assembled by attaching the magnetic surfaces of card components together. As shown by FIGS. 4c-4d, the magnetic pole alignments of card components may be similar, such that two card surfaces may be associated with each other. As an example, the upper sections 405 of both the first component 404 and the second component 401 may have a vertical magnetic pole alignment, wherein the magnetic poles 407 of the magnets alternate left to right from north pole to south pole, while the lower sections 406 of both the first component 404 and the second component 401 may have a horizontal magnetic pole alignment, wherein the magnetic poles 407 of the magnets alternate top to bottom from north pole to south pole.

FIG. 4e illustrates that the two portions 402 and 403 may be provided separately from each other, and may be associated together by a user when assembling a magnetic card. It should be understood that the portions 402 and 403 may also be provided in association with each other, wherein the portions are integral to each other.

FIG. 4f shows a front view of a card component substitute 401b' which may have a magnetically receptive material ("magnetically receptive material," or "receptive material"), according to an aspect. The receptive material may, for example, be non-magnetized rubber mixed with iron dust, and may be used for attaching to a magnetic surface, as will be further described herein.

FIGS. 5a-5e illustrate additional examples of vertical and horizontal magnetic pole alignments that may be used for attaching and detaching the various components of magnetic playing cards, according to an aspect.

FIG. 5f shows a front view of a card component substitute 501b' which may have a magnetically receptive material, according to an aspect.

Again, similar to the magnetic card assembly shown in FIGS. 4a-4f, FIGS. 5a-5f show various components that can be associated together to assemble magnetic playing cards.

FIG. 5a shows how the second component 501 may be detached from the first component 504 of an Example 1 magnetic playing card. FIG. 5b shows that two second components, a first portion 502 and a second portion 503, can be combined with a first component 504 via the magnetic surfaces of each component, to assemble a second component 501 of a magnetic playing card. Again, the alignments of the magnetic poles on the surfaces of the components may bias each portion into easily moving only in certain directions, thus indicating to the user a desired orientation of attaching the card components together.

The first portion 502 may be biased to slide in the directions indicated by arrows 542, which may be side-to-side directions to attach to the upper section 505 of the first component 504, and the second portion 503 may be biased to slide in the directions indicated by arrows 541, which may be up-and-down directions, to attach to the lower section 506 of the first component 504. Again, similar to the magnetic card assembly described when referring to FIGS. 4a-4f, together, when moved into position, the first portion 502 and the second portion 503 may become a second component, such as the second component 501 shown in an assembled state in FIG. 5d.

FIG. 5e illustrates that the two portions 502 and 503 may be provided separately from each other, and may be associated together by a user when assembling a magnetic card. It should be understood that the portions 502 and 503 may also be provided in association with each other, wherein the portions are integral to each other.

FIG. 5f shows a front view of a card component substitute 501b' which may have a magnetically receptive material, according to an aspect.

This exemplary magnetic pole alignment may be used for constructing an Example 2 magnetic playing card. An advantage may be that the first portion 502 may not be easily dislodged during placement of the magnetic card into a card sleeve, due to the horizontal alignment or magnetic poles. Thus, while moving a magnetic card up and down into or out of a card sleeve, some of the magnetic components may be discouraged from moving in these directions, and may thus remain attached to one another. Providing the second portion 503 as in the examples shown in FIGS. 5a-5e may also be advantageous because the vertical magnetic pole alignment may prevent a player's thumb from accidentally dislodging the second portion when a player is holding the card.

FIGS. 6a-6e show examples of diagonal magnetic pole alignments for magnetic playing cards, that may be used for attaching and detaching the various components of magnetic playing cards, according to an aspect.

FIG. 6f shows a front view of a card component substitute 601b' which may have a magnetically receptive material, according to an aspect.

FIG. 6a shows how the second component 601 may be detached from the first component 604 of a magnetic playing card. FIG. 6b shows that two second components, a first portion 602 and a second portion 603, can be combined with a first component 604 via the magnetic surfaces of each component, to assemble a second component 601 of a magnetic playing card. Again, the alignments of the magnetic poles on the surfaces of the components may bias each portion into easily moving only in certain directions, thus indicating to the user a desired orientation of attaching the card components together.

The first portion 602 may be biased to slide in the directions indicated by arrows 661, which may be bottom left to upper right diagonal directions to attach to the upper section 605 of the first component 604, and the second portion 603 may be biased to slide in the directions indicated by arrows 662, which may upper left to bottom right diagonal directions, to attach to the lower section 606 of the first component 604. Again, similar to the magnetic card assembly described when referring to FIGS. 4a-4e and FIGS. 5a-5e, together, when moved into position, the first portion 602 and the second portion 603 may become a second component, such as the second component 601 shown in an assembled state in FIG. 6d.

As shown in FIG. 6c, the lower section 606 of the first component 604 may be provided with a diagonal magnetic pole alignment from the top left to the bottom right, wherein the magnetic poles 607 alternate left to right from south pole to north pole while the upper section 605 of the first component 604 is provided with an opposite diagonal magnetic pole alignment from the bottom left to the top right with the magnetic poles 607 alternating left to right from south pole to north pole. As shown in FIG. 6e, the and the first portion 602 of the second component may have a diagonal magnetic pole alignment from the top left to the bottom right with the magnetic poles alternating left to right from north pole to south pole. The magnetic playing card may be, for example, an Example 2 magnetic playing card.

The receptive material as shown in FIGS. 4f, 5f, and 6f may, for example, be non-magnetized rubber mixed with iron dust, and may be used for attaching to a magnetic surface. The card component substitute 401b', 501b', 601b' may adhere to any type of pole alignment, and thus may be used as a substitute for a card front or card back. The non-magnetized rubber may be substituted for the magnetized rubber layer of the second component 401b', 501b', 601b', or any other portion of the magnetic card, allowing the second component 401b', 501b', 601b' to be attached to any magnetic pole alignment. Thus, the user can use the card component substitute 401b', 501b', 601b' as an additional game piece, or as a placeholder, or as a substitute component, such as if matching game pieces is difficult or if a game piece is missing or lost.

By providing both the first component 404, 504, 604 and the second component 401, 501, 601 with similar magnetic pole alignments, the user can be easily guided when assembling the magnetic playing card. When sliding the upper portion 402, 502, 602 onto the first component 404, 504, 604, the upper portion 402, 502, 602 may easily slide until reaching the ending of the magnetic pole alignment section, which may be where a different pole alignment begins. The point at which the alignment of the magnetic poles may change to a different alignment may be a stopping point for a portion of a card component, and the stopping point is indicated by 412, 512, 612. When a portion 402, 502, 602 is pushed downwards onto the first component 404, 504, 604, the portion 402, 502, 602 may be biased to be moved easily until it reaches the stopping point 412, 512, 612. Because of the change in magnetic pole alignment, the portion 402, 502, 602 may no longer be easily moved, or may be biased against further movement, due to the properties of the magnets in the lower section 406, 506, 606. The upper section 405, 505, 605 and the lower section 406, 506, 606 may be conducive to movements in different directions by the separate portions. For example, the first portion 402 may be guided in up-and-down directions as indicated by arrows 441, while the second portion 402 may be guided in side-to-side directions as indicated by arrows 442, and the first portion 402 may be discouraged from moving in side-to-side directions and the second portion 403 may be discouraged from moving in up-and-down directions. Thus, the orientation, alignments, and arrangements of the magnets may help to guide the various game components into a desired position or assembly or help a user to more easily assemble the components into a magnetic card.

It should be understood that the magnetic alignments of separate sections of a component (such as the upper section 505 and the lower section 506 of FIGS. 5c-5d may be provided in various ways, such as, for example, providing a diagonal alignment in the upper section 505 and a horizontal alignment in the lower section 506, or any other suitable combination.

FIGS. 7a-7e show additional examples of diagonal magnetic pole alignments for magnetic playing cards, that may be used for attaching and detaching the various components of magnetic playing cards, according to an aspect.

FIG. 7f shows a front view of a card component substitute 701b' which may have a magnetically receptive material, according to an aspect. The non-magnetized rubber may be substituted for the magnetized rubber layer of the second component 701b', allowing the second component 701b' to be attached to any magnetic pole alignment.

FIG. 7a shows how the second component 701 may be detached from the first component 704 of a magnetic playing card. The second component 701 may be biased to be associated with the first component 704 in a diagonal direction, such as in the directions indicated by arrows 761.

In FIG. 7b, arrows 761 indicate that the first portion 702 and the second portion 703 of the second component of an Example 2 magnetic playing card may slide diagonally from the bottom left to the top right to attach to the first component, and thereby creating a second component. Again, the magnetic pole alignments provided with the card components may be helpful in indicating to the user a desired orientation of attaching the card components together.

As shown in FIG. 7c, the first component 704 may have a diagonal magnetic pole alignment from the bottom left to the top right with the magnetic poles 707 alternating left to right from south to north. As shown in FIG. 7e, the first portion 702 of the second component has a diagonal magnetic pole alignment from the top left to the bottom right with the magnetic poles alternating left to right from north to south of an Example 2 magnetic playing card. The second portion 703 may have the same magnetic pole alignment as the first portion 702 and the poles alternate left to right from south to north.

The magnetic poles of the second component 701b of an Example 1 magnetic playing card may be aligned in multiple ways, two of which are shown by FIGS. 7d and 7f. In one example shown in FIG. 7d, the second component 701 has a diagonal magnetic pole alignment from the top left to the bottom right with the magnetic poles 707 alternating left to right from north to south.

FIGS. 8a-8e show an example of a horizontal magnetic pole alignment for magnetic playing cards that may be used for attaching and detaching the various components of magnetic playing cards, according to an aspect.

FIG. 8*f* shows a front view of a card component substitute 801*b*' which may have a magnetically receptive material, according to an aspect.

In FIG. 8*a*, arrows 842 indicate that the second component 801 of an Example 1 magnetic playing card may slide horizontally (in side-to-side directions) to attach to the first component 804. In FIG. 8*b*, arrows 842 indicate that the first portion 802 and the second portion 803 of the second component of an Example 2 magnetic playing card may also slide horizontally (in side-to-side directions) to attach to the first component 804.

As shown in FIG. 8*c*, the first component 804 may have a horizontal magnetic pole alignment with the magnetic poles 807 alternating top to bottom from south to north. As shown in FIG. 8*e*, the first portion 802 and the second portion 803 of the second component may have a horizontal magnetic pole alignment with the magnetic poles alternating top to bottom from north to south of an Example 2 magnetic playing card.

The magnetic poles of the second component 801 of an Example 1 magnetic playing card may be aligned in multiple ways, two of which are shown by FIGS. 8*d* and 8*f*. In one example shown in FIG. 8*d*, the second component 801 may have a horizontal magnetic pole alignment with the magnetic poles alternating top to bottom from north to south. As another example shown by FIG. 8*f*, non-magnetized rubber may be substituted for the magnetized rubber layer of the second component 801*b*', allowing the second component 801*b*' to be attached to any magnetic pole alignment.

The magnetic pole alignment shown as an example FIGS. 8*c*-8*e* may be advantageous because the horizontal alignment may prevent the first portion 802 from being dislodged while in a card sleeve. This magnetic pole alignment may also be easier to manufacture than the alignment disclosed when referring to FIG. 5*a*-5*f*, for example. Manufacturers, such as Magnum Magnetics™, that produce the raw material for magnets (magnetized rubber with vinyl adhered to one or both sides) may, during their manufacturing process, magnetize an entire large-scale product (such as a 100-foot roll of material), and magnetize this product in one continuous direction. Therefore, to create magnetic cards having the magnetic pole alignments as shown in FIGS. 5*c*-5*e*, it may be necessary to carry out a separate and secondary magnetization process target only a portion of the card components. Thus, an advantage of a single alignment being used throughout a magnetic playing card could be that costs and labor are saved. However, an advantage of two different alignments being used for a magnetic playing card could be that the card may be resistant to breaking apart or the components becoming loose as a result of lateral thumb or finger movements during use of the cards, or as a result of inserting the card into or removing the card from a card sleeve.

FIGS. 9*a*-9*e* show an example of a vertical magnetic pole alignment for magnetic playing cards, that may be used for attaching and detaching the various components of magnetic playing cards, according to an aspect.

FIG. 9*f* shows a front view of a card component substitute 901*b*' which may have a magnetically receptive material, according to an aspect.

In FIG. 9*a*, arrows 941 indicate that the second component 901 of an Example 1 magnetic playing card may slide vertically (in up-and-down directions) to attach to the first component 904. In FIG. 9*b*, arrows 941 indicate that the first portion 902 and the second portion 903 of the second component of an Example 2 magnetic playing card may both slide vertically (in up-and-down directions) to attach to the first component 904.

As shown in FIG. 9*c*, the first component 904 may have a vertical magnetic pole alignment with the magnetic poles 907 alternating left to right from south to north. As shown in FIG. 9*e*, the first portion 902 and the second portion 903 of the second component have a vertical magnetic pole alignment with the magnetic poles alternating left to right from north to south of an Example 2 magnetic playing card.

The magnetic poles of the second component 901 of an Example 1 magnetic playing card may be aligned in multiple ways, two examples of which are shown by FIGS. 9*d* and 9*f*. In one example shown in FIG. 9*d*, the second component 901 may have a vertical magnetic pole alignment with the magnetic poles alternating left to right from north to south. As another example shown by FIG. 9*f*, non-magnetized rubber may be substituted for the magnetized rubber layer of the second component 901*b*', allowing the second component 901*b*' to be attached to any magnetic pole alignment.

Again, as discussed when referring to FIGS. 4*f*, 5*f*, and 6*f*, the card component substitute 701*b*', 801*b*', and 901*b*' may be used in association with any other card components in order to assemble a magnetic playing card. The card component substitute 701*b*', 801*b*', 901*b*' may take the place of one or more other card components, for example.

Figure 10A:
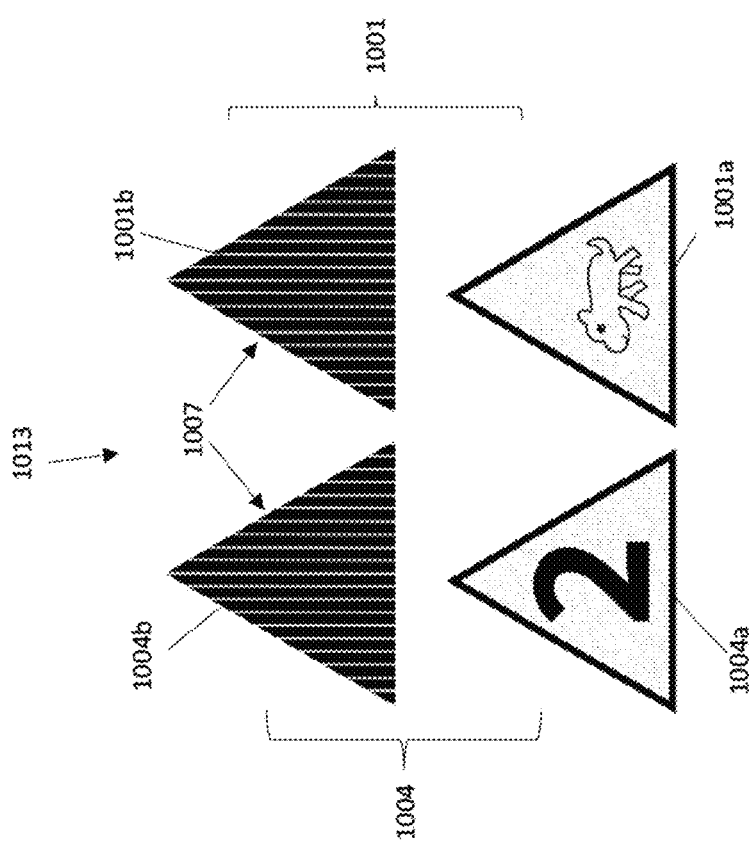

FIGS. 10*a*-10*b* illustrate examples of components of a triangular magnetic playing card 1013 and components of a circular magnetic playing card 1014, respectively, according to an aspect. As discussed hereinbefore, magnetic playing cards may be provided in a variety of shapes and sizes, such as in the examples shown, or in any other suitable shapes and sizes. FIG. 10*a* illustrates an example of a triangular magnetic playing card 1013 having two triangular components, which may be a first component 1004 and a second component 1001. The components may have vertical magnetic pole alignments as shown by the magnetic poles 1007 when viewed from the back side of the components (1004*b* and 1001*b*). In this example, the triangular magnetic playing card 1013 may be manufactured with two layers, as described when referring to FIGS. 1*a*-1*g*. The first component 1004 may have a point value printed on white vinyl and the second component 1001 may have artwork printed on white vinyl, as an example, or, the components may be printed with any other text, image, or decorative element.

FIG. 10*b* illustrates an example of a magnetic playing card 1014 with two circular components, wherein the first component 1004 and the second component 1001 are provided with vertical magnetic pole alignments, shown by the magnetic poles 1007 when viewed from the back side of the components (1004*b* and 1001*b*). In this example, the circular magnetic playing card may be manufactured with two layers, as described when referring to FIG. 1*a*-1*g*. The first component 1004 may have a point value printed on white vinyl and the second component 1001 may have artwork printed on white vinyl, or, again, or, the components may be printed with any other text, image, or decorative element.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A magnetized playing card comprising:
    a front card face;
    a back card face;
    a top card end;
    a bottom card end;
    a first card component;
    and a second card component that joins with the first card component to form the magnetized playing card;
    the first card component having:
        a front first card component face;
        a back first card component face;
    wherein at least a first section of the back first card component face is a first magnetized surface;
    the first magnetized surface having:
        a first plurality of magnetic poles comprising north poles and south poles;
        wherein the north poles and the south poles are in parallel with each other, and the north poles alternate with the south poles in an alternating formation; and
        wherein the alternating formation faces a first direction to create a first magnetic alignment;
    the second card component having:
        a front second card component face;
        a back second card component face having a second magnetized surface;
        the second magnetized surface having an opposite corresponding first magnetic alignment;
    the first magnetic alignment being capable of biasing an association of the first magnetized surface with the second magnetized surface along the first direction;
    wherein the opposite corresponding first magnetic alignment also faces the first direction and comprises south poles that correspond to the north poles of the first magnetized surface, and north poles that correspond to the south poles of the first magnetized surface; and
    wherein the second card component joins with the first card component via the back first card component face and the back second card component face, such that the front first component face is visible and comprises the front card face, and such that the front second component face is opposite to the front first component face and is visible, and comprises the back card face.

2. The magnetized playing card of claim 1, wherein the second card component comprises a first portion, and a second portion that joins with the first portion to form the second card component.

3. The magnetized playing card of claim 1, wherein the at least a first section of the back first card component face is the entire back first card component face.

4. The magnetized playing card of claim 1, further comprising a second section of the back first card component face;
    wherein the first magnetized surface within the first section is comprised of the first magnetic alignment;
    wherein the first magnetized surface within the second section is comprised of a second plurality of a second plurality of magnetic poles comprising north poles and south poles;
    wherein the north poles and the south poles are in parallel with each other, and the north poles alternate with the south poles in the alternating formation; and wherein the alternating formation within the second section faces a second direction to create a second magnetic alignment.

5. The magnetized playing card of claim 1, the back first card component face further comprising a first printed guide denoting the first direction.

6. The magnetized playing card of claim 1, wherein the first magnetic alignment is horizontal with respect to the top card end and the bottom card end.

7. The magnetized playing card of claim 1, wherein the first magnetic alignment is vertical with respect to the top card end and the bottom card end.

8. The magnetized playing card of claim 1, wherein the first magnetic alignment is diagonal with respect to the card end and the bottom card end.

9. A magnetized playing card comprising a front card face;
   a top card end;
   a bottom card end;
   a first card component;
   and a second card component that joins with the first card component;
   the first card component having:
      a front first card component face;
      a back first card component face;
   wherein at least a first section of the back first card component surface is a first magnetized surface;
   the first magnetized surface having:
      a first plurality of magnetic poles comprising north poles and south poles;
      wherein the north poles and the south poles are in parallel with each other, and the north poles alternate with the south poles in an alternating formation; and
      wherein the alternating formation faces a first direction to create a first magnetic alignment;
   the second card component having:
      a front second card component face;
      a back second card component face wherein the second card component joins with the first card component via the back first card component face and the back second card component face to form the magnetized playing card.

10. The magnetized playing card of claim 9, the magnetized playing card having a circular shape.

11. The magnetized playing card of claim 9, the magnetized playing card having a triangular shape.

12. The magnetized playing card of claim 9, wherein the second card component comprises a first portion, and a second portion that joins with the first portion to form the second card component.

13. The magnetized playing card of claim 9, wherein the at least a first section of the back first card component face is the entire back first card component face.

14. The magnetized playing card of claim 9, further comprising a second section of the back first card component face;
   wherein the first magnetized surface within the first section is comprised of the first magnetic alignment;
   wherein the first magnetized surface within the second section is comprised of a second plurality of magnetic poles comprising north poles and south poles;
   wherein the north poles and the south poles are in parallel with each other, and the north poles alternate with the south poles in the alternating formation; and
   wherein the alternating formation faces a second direction to create a second magnetic alignment.

15. The magnetized playing card of claim 9, wherein the first magnetic alignment is horizontal with respect to the top card end and the bottom card end.

16. The magnetized playing card of claim 9, wherein the first magnetic alignment is vertical with respect to the top card end and the bottom card end.

17. The magnetized playing card of claim 9, wherein the first magnetic alignment is diagonal with respect to the bottom card end.

18. A magnetized playing card comprising:
   a front card face;
   a back card face;
   a top card end;
   a bottom card end;
   a first card component;
   and a second card component that joins with the first card component to form the magnetized playing card;
   the first card component having:
      a front first card component face;
      a back first card component face; and
      a first magnetized surface;
   the first magnetized surface having a first section and a second section;
   the first section having:
      a first plurality of magnetic poles comprising north poles and south poles;
      wherein the north poles and the south poles are in parallel with each other, and the north poles alternate with the south poles in an alternating formation; and
      wherein the alternating formation faces a first direction to create a first magnetic alignment;
   the second section having:
      a second plurality of magnetic poles comprising north poles and south poles;
      wherein the north poles and the south poles are in parallel with each other, and the north poles alternate with the south poles in the alternating formation; and
      wherein the alternating formation faces a second direction to create a second magnetic alignment;
   the second card component having:
      a front second card component face;
      a back second card component face having a second magnetized surface;
      a first portion; and
      a second portion that joins with the first portion to form the second card component;
   wherein the second magnetized surface within the first portion has an opposite corresponding first magnetic alignment, the opposite corresponding first magnetic alignment facing the first direction and comprising south poles that correspond to the north poles of the first magnetized surface, and north poles that correspond to the south poles of the first magnetized surface within the first section;
   wherein the second magnetized surface within the second portion has an opposite corresponding second magnetic alignment, the opposite corresponding second magnetic alignment facing the second direction and comprising south poles that correspond to the north poles of the first magnetized surface, and north poles that correspond to the south poles of the first magnetized surface within the second section;
   the first magnetic alignment being capable of biasing an association of the back first card component face with the second magnetized surface along the first direction;

the second magnetic alignment being capable of biasing an association of the back first card component face with the second magnetized surface along the second direction; and wherein the second card component joins with the first card component via the back first card component face and the back second card component face, such that the front first component face is visible and comprises the front card face, and such that the front second component face is opposite to the front first component face and is visible, and comprises the back card face.

19. The magnetized playing card of claim 18, wherein the first magnetic alignment is horizontal with respect to the top card end and the bottom card end.

20. The magnetized playing card of claim 18, the back first card component face further comprising a first printed guide denoting the first direction and a second printed guide denoting the second direction.

\* \* \* \* \*